United States Patent Office 3,325,466
Patented June 13, 1967

3,325,466
TERTIARY BUTYL GROUP AS A CARBOXYL PROTECTING GROUP IN THE SYNTHESIS OF PEPTIDES
George W. Anderson, Upper Saddle River, N.J., and Francis M. Callahan, Stony Point, N.Y., assignors to American Cyanamid Company, Stamford, Conn., a corporation of Maine
No Drawing. Original application Jan. 11, 1961, Ser. No. 81,942. Divided and this application Nov. 12, 1963, Ser. No. 323,092
1 Claim. (Cl. 260—112.5)

This invention relates to novel stable tertiary butyl esters of naturally-occurring α-amino acids useful as reagents in peptide snythesis and more particularly to a process for using same in peptide synthesis.

This application is a division of our copending application Ser. No. 81,942, filed Jan. 11, 1961, now abndoned, which in turn is a continuation-in-part of our copending application Ser. No. 734,124, filed May 9, 1958, now abandoned.

As is well-known in peptide synthesis, to prevent undesired reactions and obtain only the desired reaction between two amino acids the amino group of one of the amino acids or peptides involved in the reaction must be effectively protected or blocked from taking part in the reaction while the carboxy group of the other likewise must be so protected. Heretofore, it has generally been customary to protect the carboxy group by converting it into an ester group by way of reaction with a primary alcohol such as methanol or ethanol. While such a protective group has been widely used in peptide synthesis, it nevertheless offers serious disadvantages which are not associated with our invention. The methyl or ethyl esters of naturally-occurring α-amino acids are relatively unstable compounds. For instance, in the case of freshly prepared ethyl glycinate there is substantial deterioration to diketopiperazine on standing at room temperature for only twenty-four hours and even at −20° C. after just a few days. Consequently, the methyl or ethyl ester is stored, until ready for use, in the form of its hydrobromide or hydrochloride salt, which salt is added to the peptide-forming reaction medium along with a stoichiometric amount of tertiary amine base, whereupon the free ester is liberated from the salt. Even so, the presence of tertiary amine salts, e.g., pyridine hydrochloride, frequently leads to partial racemization of the optically active center of one of the reactants, namely, the naturally-occurring α-amino acid whose free amine group or groups is protected or blocked from taking part in the reaction. Partial racemization means serious loss in yield of desired product.

We have now found, unexpectedly, that the novel tertiary butyl esters of our invention are outstandingly more stable than the primary alcohol esters of the prior art. For example, tertiary butyl glycinate may be stored at room temperature for many weeks without showing signs of diketopiperazine formation. This surprising increase in stability, therefore, makes it possible to store and use the tertiary butyl esters of amino acids and peptides, per se, and thus the use of the hydrochloride or hydrobromide salts with accompanying racemization may be avoided.

A preferred method of preparing the tertiary butyl esters of the invention involves, in general, reacting, in an inert water-immiscible solvent, a naturally-occurring α-amino acid having a free carboxylic acid group or groups with at least a stoichiometrically equivalent quantity of isobutylene in the presence of an acid catalyst. The free amino groups which tend to exert a zwitter-ion effect are prevented from interfering with the reaction by being blocked by a carbobenzoxy group. After ester formation with the isobutylene, the carbobenzoxy group is removed by catalytic hydrogenation.

Usually the N-carbobenzoxy block α-amino acid is first dissolved in a water-immiscible organic solvent. Useful solvents of this type include methylene chloride and methyl isopropyl ketone. The choice of solvent, however, is not critical, the chief criteria being that it have solvent properties for the reactants, remain inert to the acid catalyst used and should not tend to promote the polymerization of isobutylene. Following dissolution of the N-blocked amino acid moeity in the water-immiscible organic solvent an effective amount of an esterification catalyst such as sulfuric acid, p-toluenesulfonic acid, etc., is added. The amount of catalyst is not critical but from about 2% to about 12% based on the weight of the N-blocked amino acid is preferred. After the addition of the catalyst at least a stoichiometrically equivalent quantity of gaseous isobutylene is passed into the solution. While a stoichiometrically equivalent quantity of isobutylene is workable in this process, it is usually preferable to use at least 4 such equivalent quantities of isobutylene per single equivalent quantity of the N-carbobenzoxy amino acid. An exothermic reaction is usually observed during this stage. The temperature range for the isobutylene reaction is not critical, any temperature between 0° and 100° C. being suitable. It is to be understood, however, that in the upper portion of this temperature range the reaction should be conducted under pressure to avoid undue loss of gaseous isobutylene.

Following the addition of isobutylene the resulting reaction mixture is kept for several hours in a closed vessel, after which period isolation of the product is begun by adding a dilute aqueous solution of strong alkali such as sodium hydroxide or triethylamine. The alkali wash is conducted for the purpose of removing unconverted N-carbobenzoxy blocked amino acid from the solvent layer. The amount of alkali used is such that there will remain a slight excess of alkali following a neutralization of the unconverted starting material. Following the alkali wash the organic solvent layer is separated off, washed with distilled water and dried. The solvent layer contains the tertiary butyl ester of the N-carbobenzoxy blocked naturally-occuring α-amino acid in essentially pure condition. Cleavage of the carbobenzoxy blocking group from this intermediate product may then be effected by catalytic hydrogenation as described immediately below. Removal of the solvent may be effected if necessary, at this stage.

The removal of the carbobenzoxy group by catalytic hydrogenation, without disturbing the tertiary butyl ester group, may be effected under conditions well known in the hydrogenation art. The catalyst and the reaction conditions are not critical.

As to the catalyst, any metal normally used for ordinary hydrogenation reactions, e.g., palladium, platinum, nickel (Raney), rhodium, etc., may be used. The amount of catalyst may be varied over a wide range. As to other conditions, the time, temperature and pressure may likewise be varied over a wide range. The reaction solvent is not critical and any relatively inert (to hydrogenation), low molecular weight organic solvent, such as ethanol, is useable.

Usually it is preferred to dissolve the N-carbobenzoxy ester in absolute ethanol and then add an effective amount of 10% palladium on charcoal, ordinarily about 5 to 15% based on the weight of the N-carbobenzoxy ester. Following this, hydrogen gas is bubbled through the suspension at about room temperature and atmospheric pressure for at least about an hour, whereupon the suspension is filtered to remove the catalyst and thereby leaving the free tertiary butyl ester in the filtrate.

The tertiary butyl ester may be obtained from the filtrate by non-critical conventional refining techniques either as the free ester, per se, or when so desired, as a mild acid salt thereof, where the acid has a $pK_a$ value of 6.0 or less.

For instance, where it is desirable to obtain the free tertiary butyl ester directly, the filtrate may be evaporated to dryness or it may be subjected to fractional distillation under vacuum. Alternatively, to recover the ester by way of the preparation of an intermediate salt, a salt of a weak acid such as phosphorus acid (or butanetetracarboxylic acid), the filtrate of above is reduced in volume by application of vacuum, whereupon about a stoichiometrically equivalent quantity of phosphorus acid in a water-immiscible organic solvent such as diethyl ether is added. The phosphite salt precipitates and is separated off. The acid salt is resuspended in a suitable water-immiscible organic solvent such as diethyl ether, whereupon the solvent suspension is shaken with an aqueous alkali solution, the solvent layer separated, washed with distilled water and dried. The dried residue is then distilled to yield the free tertiary butyl ester base.

The term "naturally occurring α-amino acid" as used herein is to be understood as referring to those α-amino acids listed in the table common to pages 276 and 277 of the text Organic Chemistry, Second English Edition, Paul Karrer, Elsevier Publishing Company, Inc., New York, 1946. The acids in question are glycine (glycocoll), alanine, serine, amino-butyric acid, methionine, valine, norleucine, leucine, isoleucine, phenylalanine, tyrosine, dihydroxyphenylalanine, tryptophane, histidine, cystine, arginine, ornithine, lysine, aspartic acid, glutamic acid, glutamine, hydroxyglutamic acid, threonine (theonine), proline and hydroxyproline.

The following examples are for the purpose of describing our invention in greater detail and should not be considered as limiting it.

EXAMPLE 1

*Tertiary butyl carbobenzoxyglycinate*

This example illustrates the treatment of carbobenzoxyglycine with isobutylene. A 20.9 gram portion of carbobenzoxyglycine was dissolved in methyl isopropyl ketone, and 2.0 grams of p-toluenesulfonic acid were added as a catalyst. Then 23 grams of isobutylene were passed into the solution, at room temperature, during which an exothermic reaction was observed. The solution was kept in a stoppered flask for a period of 18 hours. Isolation of the product was accomplished by adding the reaction product to an aqueous solution of dilute (4%) sodium hydroxide. The amount of sodium hydroxide was such that a slight excess of alkali would remain after neutralization of unconverted carbobenzoxyglycine. The ketone layer was separated, washed with distilled water, and dried. Then the ketone was completely removed by distillation at a very low pressure (0.35 mm. Hg). A light amber-colored oil remained which was tertiary butyl carbobenzoxyglycinate, $N_D^{28}=1.4957$.

EXAMPLE 2

*Tertiary butyl carbobenzoxy-L-tyrosinate*

This example illustrates the treatment of carbobenzoxy-L-tyrosine with isobutylene under essentially the same conditions as in Example 1 for carbobenzoxyglycine. The product, tertiary butyl carbobenzoxy-L-tyrosinate, was an extremely viscous oil which had an index of refraction, $N_D^{26.5}$, of 1.5222, a density (D 26.5/26.5) of 1.1212 and a molar refraction ($Mr_D$) of 101.07 (calculated from atomic refractions: 100.04).

EXAMPLE 3

*Tertiary butyl carbobenzoxy-DL-phenylalaninate*

A 45 gram portion of carbobenzoxy-DL-phenylalanine and 1.0 ml. of concentrated sulfuric acid were dissolved in 300 ml. of methyl isopropyl ketone. Then 56.5 grams of isobutylene were passed into the solution and this solution kept in a tightly-stoppered flask for six days. The product was isolated by the addition of the reaction solution to 200 ml. of a 2% solution of sodium hydroxide. The ketone layer was separated and washed with distilled water. Removal of the ketone from the ester was accomplished by heating the product to 40° C. at a pressure of 0.2 mm. Hg. The residue was a very viscous oil which had an index of refraction $N_D^{28}=1.5196$, a density (D 28/28) of 1.0914 and a molar refraction ($Mr_D$) of 98.94 (calculated from atomic refractions: 98.51).

EXAMPLE 4

*Tertiary butyl carbobenzoxy-DL-valinate*

This example illustrates the treatment of carbobenzoxy-DL-valine with isobutylene under essentially the same conditions as in Example 1 for carbobenoxyglycine. Tertiary butyl carbobenzoxy-DL-valinate proved to have an index of refraction ($N_D^{27}$) of 1.4806, a density (D 27/27) of 1.0329 and a molar refraction ($Mr_D$) of 84.63 (calculated from atomic refractions: 84.21).

EXAMPLE 5

*Tertiary butyl carbobenzoxyglycyl-L-phenylalaninate*

This example illustrates the treatment of carbobenzoxyglycyl-L-phenylalanine with isobutylene. An 18.3 gram amount of carbobenzoxyglycyl-L-phenylalanine was suspended in 500 ml. of methylene chloride. A 1.0 ml. portion of concentrated sulfuric acid was added to the mixture and isobutylene passed into the stirred suspension. Solution of this dipeptide acid was rapid and complete within a few minutes. The solution was allowed to stand at room temperature (25°±5° C.) for 20 hours. Isolation of the product was accomplished by adding the reaction solution to 200 ml. of a 5% potassium hydroxide solution. The methylene chloride fraction was washed with water, dried over anhydrous sodium sulfate, and concentrated to dryness at 100° C. at a pressure of 0.2 mm. Hg. The residue, on treatment with 125 ml. of diisopropyl ether, crystallized rapidly. The product was collected by filtration and dried. It had a melting point of 61°–63° C.

EXAMPLE 6

*Tertiary butyl carbobenzoxy-L-leucinate*

This example illustrates the treatment of carbobenzoxy-L-leucine with isobutylene. A 100 gram amount of carbobenzoxy-L-leucine (0.379 mole with 1.5 moles of water of hydration) was dissolved in 400 ml. of methylene chloride containing 3 ml. of concentrated sulfuric acid. Isobutylene was bubbled into the solution until an excess of the gas was present. After a period of 16 hours at about 25° C. the solution was added to an aqueous solution of sodium carbonate whose strength was sufficient to neutralize all acids present. Evaporation of the methylene chloride solution to dryness under vacuum yielded a colorless oil, $n_D^{25}=1.4853$.

EXAMPLE 7

*Tertiary butyl carbobenzoxy-L-phenylalaninate*

This example illustrates the treatment of carbobenzoxy-L-phenylalaninate with isobutylene. A 40.3 gram quantity of carbobenzoxy-L-phenylalanine was dissolved in 1500 ml. of methylene chloride and then 5 ml. of concentrated sulfuric acid was added. The resulting mixture was saturated at room temperature with isobutylene and allowed to stand in a stoppered vessel for 24 hours, whereupon 1000 ml. of a 5% aqueous potassium bicarbonate solution was added. The resulting methylene chloride layer was separated and dried. Finally, the methylene chloride was removed by evaporation in an open vessel leaving a crystalline residue which when recrystallized from diisopropyl ether yielded crystals having a melting point of 80.5–81.5° C.

EXAMPLE 8

*Tertiary butyl carbobenzoxy-L-prolinate*

Three milliliters of concentrated sulfuric acid were added to a solution of 74.3 g. (0.30 mole) of carbobenzoxy-L-proline in 600 ml. of methylene chloride. The solution was saturated with isobutylene, causing a volume increase of 300 ml. After 65 hours at room temperature, the solution was added to 500 ml. of water containing sodium carbonate sufficient to neutralize all acids. The methylene chloride layer was separated, washed with water, then concentrated under vacuum at 60° to an oil which crystallized as a product having a melting point of 44–45° C.

EXAMPLE 9

*Tertiary butyl carbobenzoxy-DL-alaninate*

To 22.3 g. (0.1 mole) of carbobenzoxy-DL-alaninate were added 200 ml. of methyl isopropyl ketone and to the resulting solution was added 1.0 g. of concentrated sulfuric acid. Then 30.3 g. (0.541 mole) of isobutylene were bubbled into the blend, whereupon the vessel containing the reaction mixture was sealed and kept at room temperature for a period of 4 days. At the end of that period the reaction product was added to a dilute (4%) aqueous solution of sodium hydroxide, the amount of the dilute solution being such that a slight excess of alkali would remain after neutralization of unconverted carbobenzoxy-DL-alanine. The ketone layer was separated, washed with distilled water and dried, the ketone being removed by vacuum distillation. The product was a light yellow oil, $N_D^{25}=1.4877$.

EXAMPLE 10

*Ditertiary butyl carbobenzoxy-L-glutamate*

To a solution of 11.2 gm. of carbobenzoxy-L-glutamic acid dissolved in a solvent mixture of a 1:1 ratio of methylene chloride and methyl isopropyl ketone whose volume was 1 liter was added 2 ml. $H_2SO_4$ and sufficient isobutylene until no further gas could dissolve. After 65 hours at room temperature, the solution was added to an aqueous solution of potassium carbonate with sufficient base present to neutralize all acids present. The organic solvent layer was separated and dried over solid $Na_2SO_4$. Evaporation of the solvent left the product, an oily residue whose $n_D^{25}=1.4867$.

EXAMPLE 11

*Tertiary butyl carbobenzoxy-L-glutaminate*

The procedure of Example 10 was repeated except that 8.4 grams of carbobenzoxy-L-glutamine was used instead of 11.2 grams of carbobenzoxy-L-glutamic acid; 400 ml. of methylene chloride was used instead of the solvent mixture and 1 ml. instead of 2 ml. of concentrated sulfuric acid was used. Evaporation of the solvent layer yielded a white crystalline product which when purified had a melting point of 94–95° C.

EXAMPLE 12

*Tertiary butyl carbobenzoxy-L-isoleucinate*

This example illustrates the treatment of carbobenzoxy-L-isoleucine with isobutylene. An 87.3 gram quantity of carbobenzoxy-L-isoleucine was dissolved in 850 ml. methylene chloride containing 3 ml. of concentrated sulfuric acid. Gaseous isobutylene was passed into the solution until a state of saturation existed. The vessel was sealed for 48 hours and the contents then worked up in the same manner as the reaction product of Example 6. The oily residue had an $N_D^{20}=1.5190$.

EXAMPLE 13

*Tertiary butyl carbobenzoxy-L-methioninate*

One tenth of a mole of carbobenzoxy-L-methionine was dissolved in 750 ml. of $CH_2Cl_2$ containing 3 ml. $H_2SO_4$. Isobutylene was added to the solution until a state of saturation existed. After allowing the compounds to interact for a period of 48 hours, the solution was added to 500 ml. of a 5% solution of sodium bicarbonate solution. The methylene chloride layer was separated and evaporated to dryness under reduced pressure. The oily residue had an $n_D^{20}=1.5190$.

EXAMPLE 14

*Tertiary butyl carbobenzoxy-L-valinate*

Carbobenzoxy-L-valine (75.3 g., 0.30 mole) was added to 850 ml. $CH_2Cl_2$ containing 3.0 ml. of concentrated sulfuric acid. Isobutylene gas was bubbled into the solution until an increase of volume of 100 cc. was observed. After standing for a period of 70 hours at room temperature, the compound was isolated as in the previous experiments by addition of the reaction mixture to an excess of potassium bicarbonate solution. Isolation of the product was obtained by concentrating the $CH_2Cl_2$ solution as far as possible at reduced pressure. An oily residue remained with an $n_D^{20}=1.4887$.

EXAMPLE 15

*Tertiary butyl carbobenzoxy-L-tryptophanate*

Carbobenzoxy-L-tryptophane (13.0 g., 0.0385 mole) was added to 700 ml. $CH_2Cl_2$ containing 1 ml. of $H_2SO_4$. To the stirred suspension was added gaseous isobutylene causing the material to rapidly dissolve. After 24 hours in a closed vessel at the ambient temperature, the product was added to 300 ml. of 5% sodium bicarbonate solution. Evaporation of the organic layer, after its separation and drying, yielded the desired product as a gum. The compound analyzed properly and was soluble in ether.

EXAMPLE 16

*Tertiary butyl-L-glutaminate phosphite*

The tertiary butyl ester of carbobenzoxy-L-glutaminic acid (3.3 g., 0.010 mole) and 500 mg. 10% palladium-on-charcoal were added to 25 ml. ethanol. Hydrogen gas was bubbled through the mixture for a period of one hour. The catalyst was removed by filtration and to the filtrate was added 820 mg. (0.010 mole) of phosphorous acid. The addition of 100 ml. of diisopropyl ether caused the precipitation of the phosphite salt of the tertiary butyl ester of glutaminic acid as crystals, M.P. 123–124° C.

EXAMPLE 17

*Tertiary butyl-L-prolinate*

Hydrogenation of 30.5 g. (0.10 mole) of tertiary butyl carbobenzoxy-L-prolinate in 250 ml. of absolute ethanol in the presence of 3 g. of 10% palladium-on-charcoal was accomplished in 3 hours. After removal of the catalyst, the resulting solution was concentrated to 75 ml. under vacuum and 8.2 g. (0.10 mole) of phosphorous acid in 200 ml. of ether was added. The phosphite salt precipitated as an oil so 250 ml. of water was added. The aqueous layer was made alkaline with 7 g. of NaOH and then extracted with two 100-ml. portions of ether. The combined ether solutions were dried over sodium sulfate, then concentrated under vacuum to yield an oil, B.P. approximately 57° at 1.5 mm.

EXAMPLE 18

*Ditertiary butyl-L-glutamate*

An 11 g. quantity of ditertiary butyl-L-carbobenzoxy-glutamate and 1.5 g. of 1% palladium-on-charcoal were added to 100 ml. of ethanol. Hydrogen gas was bubbled through the suspension for a period of one hour. The catalyst was removed by filtration and the ester recovered by fractional distillation of the filtrate to yield an oil, B.P. 110° C. at 0.05 mm. Hg.

EXAMPLE 19

*Tertiary butyl-L-valinate*

The procedure of Example 18 was repeated using 81 g. of tertiary butyl carbobenzoxy-L-valinate and 10 g. of 10% palladium-on-charcoal with 500 ml. of ethanol for a period of 3.5 hours. The oily ester on recovery had a B.P. of 63° at 1.25 mm. Hg.

EXAMPLE 20

*Tertiary butyl-L-isoleucinate*

The procedure of Example 19 was repeated using 92 g. of tertiary butyl-L-carbobenzoxyisoleucinate and 10 g. of 10% palladium-on-charcoal with 500 ml. of ethanol. The reduction period lasted for 3.5 hours. The oily ester recovered had a B.P. 52° C. at 0.45 mm. Hg.

EXAMPLE 21

*Tertiary butyl-L-tryptophanate*

The procedure of Example 20 was repeated using 14.5 g. of tertiary butyl carbobenzoxy-L-tryptophanate dissolved in 100 ml. ethanol solvent. The hydrogenation was conducted in the presence of 1 g. of 10% palladium-on-charcoal over a period of 75 min. From the alcoholic filtrate was obtained by evaporation after removal of the catalyst, a slightly opaque oil which analyzed as the ester hemi-hydrate.

EXAMPLE 22

*Tertiary butyl glycinate*

This example shows the preparation of tertiary butyl glycinate from tertiary butyl carbobenzoxyglycinate. A 15.3 gram portion of tertiary butyl carbobenzoyglycinate was dissolved in 50 ml. of absolute ethanol. A 1.0 gram portion of 10% palladium on charcoal was added as a catalyst and hydrogen gas passed into the suspension for a period of one hour. The catalyst was removed by filtration. To the filtrate were added 4.75 grams of phosphorous acid. Precipitation of the product was immediate. After a short period, the product was collected and amounted to 10.0 grams. The tertiary butyl glycinate phosphite melted at 155°–157° C. (uncorrected). A 10.65 gram portion of tertiary butyl glycinate phosphite was suspended in 100 ml. of ether. This ether suspension was shaken with 50 ml. of a 2 N sodium hydroxide solution. The ether layer was separated, washed with distilled water, and dried. Concentration and distillation of the residue yielded the free base. The tertiary butyl glycinate had the following properties:

A boiling point (uncorrected) of 30° C. at 2 mm. Hg., an index of refraction $(N_D^{24}) = 1.4227$, a density (D 24/24 = 0.9596 and molar refraction $(Mr_D)$ of 34.79 (calculated from atomic refractions: 35.11).

EXAMPLE 23

*Di-(tertiary butyl glucyinate) butanetetracarboxylate*

This example involves the preparation of di-(tertiary butyl glycinate) butanetetracarboxylate from tertiary butyl carbobenzoxyglycinate. (The former compound may then be treated with aqueous alkali to provide a solution, this solution then being extracted into diethel ether whereupon the free amino acid ester, tertiary butyl glycinate, may be recovered by subsequent distillation of the ether solution.) Tertiary butyl carbobenzoxyglycinate was treated with hydrogen gas under the conditions disclosed in Example 22 whereupon the palladium catalyst was removed by filtration. To the resulting filtrate was added a stoichiometric quantity of butanetetracarboxylic acid sufficient to form the diester salt. The acid promptly dissolved with immediate reappearance of the salt in crystalline form. A portion of anhydrous ether, equal to the volume of the filtrate was added to insure complete precipitation of the salt. The salt was collected by filtration and appeared as uniform, small refracting plates under the polarized light of a microscope. The salt melted, with decomposition, from 148° to 150° C. Recrystallization of the product from a solvent mixture of methanol and diisopropyl ether did not raise the melting point.

EXAMPLE 24

*Tertiary butyl L-tyrosinate*

This example shows the preparation of tertiary butyl L-tyrosinate from tertiary butyl carbobenzoxy-L-tyrosinate. A 13.0 gram (0.035 mole) portion of tertiary butyl carbobenzoxy-L-tyrosinate was dissolved in 40 ml. of absolute ethanol. A 2.0 gram portion of 10% palladium on charcoal was added as a catalyst and hydrogen gas passed into the suspension for a period of one hour. The catalyst was then removed by filtration. To the filtrate were added 2.87 grams (0.035 mole) of phosphorous acid. A precipitate, the phosphite salt of tertiary butyl-L-tyrosinate, resulted. The crude salt was collected and dissolved in the minimal amount of methanol needed to effect a complete solution. A pure crystalline product was then obtained as a precipitate by adding diisopropyl ether. The crystalline product melted at 185–188° C. (with decomposition), and had a specific rotation $(\alpha)_D^{25}$, of +4.4 (concentration 5.01, water). A portion of tertiary butyl L-tyrosinate phosphite was dissolved in a minimum amount of water and the pH of the solution raised to about 9 using N NaOH solution. The product, tertiary butyl L-tyrosinate, promptly precipitated out in crystalline form. The precipitate was collected by filtration, dried, and recrystallized from a solvent mixture of isopropanol and normal heptane. The final product melted at 142°–143° C.

EXAMPLE 25

*Tertiary butyl DL-phenylalaninate*

A 14 gram portion of tertiary butyl carbobenzoxy-DL-phenylalaninate was dissolved in 50 ml. of absolute ethanol and 2.5 grams of 10% palladium on charcoal were added as catalyst. Hydrogen was then bubbled through the suspension for a period of one hour. The catalyst was separated by filtration and phosphorous acid added to the filtrate. The product appeared immediately as shiny white plates. A total of 8.7 grams of tertiary butyl DL-phenylalaninate phosphite was obtained. The product had a melting point of 168.5°–169.5° C. (uncorrected) and decomposed on melting. A 22.7 gram portion of tertiary butyl DL-phenylalaninate phosphite was shaken with 100 ml. of a 4% solution of sodium hydroxide. The base was immediately extracted into 100 ml. of ether. The ether layer was separated and washed with 10 ml. of distilled water. The ether layer was then distilled under reduced pressure. The ester has a boiling range of 94°–96° C. at 0.35 mm. Hg. The product was water-white in color and had the following physical properties: an index of refraction $(N_D^{27})$ of 1.4948, a density (D 27/27) of 1.0135, a molar refraction $(Mr_D)$ of 64.22 (calculated from atomic refractions: 63.77). It was also found to have storage stability similar to tertiary butyl glycinate.

EXAMPLE 26

*Tertiary butyl D-phenylalaninate phosphite*

A 3.55 gram portion of tertiary butyl carbobenzoxy-D-phenylalaninate was dissolved in 35 ml. of absolute ethanol, and 1.0 gram of 10% palladium on charcoal was added as catalyst, under an atmosphere of nitrogen. Hydrogen gas was bubbled at a good rate through the reaction mixture for a period of 65 minutes; there being a 7-minute induction period before carbon dioxide was evolved. The catalyst was removed by filtration under an atmosphere of nitrogen. The filtrate was concentrated to a volume of 10 ml. by applying vacuum. To the amino acid ester solution was added 0.82 gram of phosphorous acid dissolved in 10 ml. of diethyl ether. Precipitation of a white, crystalline product was immediate, this material having a melting point of 157°–158° C.

EXAMPLE 27

Tertiary butyl-L-phenylalaninate

An appropriately sized quantity of tertiary butyl carbobenzoxy-L-phenylalaninate was treated in accordance with the process of Example 26. The resulting crystalline product was characterized by an index of refraction ($N_D^{20}$) of 1.4970 and a boiling point (0.25 mm. Hg) of 107° C.

EXAMPLE 28

Tertiary butyl L-leucinate phosphite

A 16.1 gram portion of tertiary butyl carbobenzoxy-L-leucinate (0.050 mole) having an index of refraction $N_D^{26.5}=1.4860$ was dissolved in 50 ml. of absolute ethanol. A 1.0 gram portion of 10% palladium on charcoal was added as a catalyst and hydrogen gas passed into the suspension for a period of 2½ hours at room temperature (25°±5° C.). The catalyst was removed by filtration at the end of the reaction period. To the filtrate were added 4.1 grams of phosphorous acid (0.050 mole), giving a precipitate of 10 grams having a decomposition-type melting point of 160°–161° C. A single recrystallization from a solvent mixture of 50/50 ethanol and diisopropyl ether gave a product with a melting point of 163°–164° C.

EXAMPLE 29

Tertiary butyl glycyl-L-phenylalaninate

Tertiary butyl carbobenzoxyglycyl-L-phenylalaninate (0.020 mole) was dissolved in 100 ml. of absolute ethanol. To the reaction flask were added 2.0 grams of 10% palladium on charcoal catalyst. Hydrogen gas was passed through this solution for a period of one hour. The catalyst was separated by filtration. To the filtrate were added 1.64 grams of phosphorous acid (0.020 mole). The clear filtrate was evaporated to a volume of 20 ml. A 600 ml. portion of a 50/50 solvent mixture of diethyl ether and diisopropyl ether were added to the concentrated filtrate. The product precipitated from solution and crystallized rapidly. An 8.0 gram portion of the aforesaid crystalline product was then treated with 25 ml. of distilled water containing a slight excess of sodium hydroxide. The product promptly dissolved, giving a turbid mixture. This mixture was extracted with 50 ml. of diethyl ether, the ether layer washed with 10 ml. of distilled water, and then the ether layer concentrated as far as possible at 0.1 mm. Hg at 25°±5° C. A white, viscous oil remained which gave a strongly alkaline reaction to moist litmus paper. The tertiary butyl glycylphenylalaninate had the following properties (based on the supercooled liquid): an index of refraction ($N_D^{25}$)=1.4987, a density (D 25/25) of 1.0707 and a molar refraction ($Mr_D$) of 76.28 (calculated: 76.44).

EXAMPLE 30

This example illustrates the use of a tertiary butyl naturally-occurring α-amino acid ester in a typical peptide synthesis.

*Part A: Tertiary butyl phthaloylglycylglycinate.*—Phthaloylglycine (2.05 gms.), tertiary butyl glycinate phosphite (2.23 gms.), triethyl amine (1.40 ml.), tetrahydrofuran (17 ml.) and dicyclohexyl carbodiimide (2.27 gms.) were reacted under reflux conditions for a period of 10 minutes. The product was cooled to room temperature (25°±5° C.) and filtered. Enough glacial acetic acid was added to the filtrate to decompose the unused dicyclohexyl carbodiimide, whereupon filtration was again effected. The final filtrate itself was added to 50 ml. of water, which caused the product, tertiary butyl phthaloylglycylglycinate, to separate as an oil which promptly became crystalline and was found to have a melting point of 145°–148° C. The principal impurities, traces of urea and a fair amount of acyl urea, whre removed from the product by recrystallization from a solvent mixture of methyl ethyl ketone and heptane. The pure material had a melting point of 165.0°–165.5° C. (uncorrected).

*Part B: Phthaloylglycylglycine.*—A 740 milligram portion of tertiary butyl phthaloylglycylglycinate was treated for two minutes at room temperature (24° C.) with 9.0 ml. of a solution of glacial acetic acid which contained 1.4 grams of anhydrous hydrogen bromide gas. After two minutes, the product was filtered and the residue washed with distilled water. The product exhibiting a 95% yield had a melting point of 236.5°–237.0° C. (uncorrected).

EXAMPLE 31

Comparison of the storage stability of tertiary butyl glycinate with ethyl glycinate Samples of freshly prepared tertiary butyl glycinate and ethyl glycinate were placed in vials. One set of vials was stored at 24° C. and another at −20 C. and observed for a period of time to determine storage stability characteristics. Loss of stability was measured by the development of a precipitate of diketopiperazine and a significant change in index of refraction of the liquid esters. The test results at 24° C. were as follows: The ethyl glycinate showed some precipitate of diketopiperazine after only 1 day and such an extensive precipitation after 4 days that the mixture became completely solid. In contrast, the tertiary butyl glycinate remained a perfectly clear liquid with Index of Refraction value unchanged from $N_D^{24}=1.4227$ for 27 days, becoming only slightly hazy with a precipitate of diketopiperazine and changing to $N_D^{24}=1.4231$ after 41 days and after 55 days, becoming about 2% solidified and attaining an $N_D^{24}$ value of 1.4243. The test results at −20° C. were as follows: The ethyl glycinate remained a clear liquid for 4 days but showed a heavy precipitate of diketopiperazine after 14 days and was one-quarter solidified after 21 days. In contrast, the tertiary butyl glycinate remained (for at least 55 days) a clear liquid with the $N_D^{24}$ value remaining unchanged

We claim:

In a process for the synthesis of peptides where a naturally-occurring α-amino acid, or a peptide preparable from said naturally-occurring α-amino acid, having its amine function or functions blocked by a radical so as to prevent said function or functions from exerting a zwitter-ion effect is brought into reactive contact with an ester of a naturally-occurring α-amino acid, the improvement comprising the use of a tertiary butyl ester of a naturally-occurring α-amino acid as said ester, said naturally-occurring α-amino acid being selected from the group consisting of glycine, alanine, serine, amino-butyric acid, methionine, valine, norleucine, leucine, isoleucine, phenylalanine, tyrosine, dihydroxy-phenylalanine tryptophane, histidine, cystine, arginane, ornithine, lysine, aspartic acid, glutamic acid, glutamine, hydroxyglutamic acid, threonine, proline and hydroxyproline.

References Cited

UNITED STATES PATENTS 2,708,667   5/1955   Young et al. _____ 260—112.5

FOREIGN PATENTS 879,732   10/1961   Great Britain.

OTHER REFERENCES

Beilstein, Handbuch der Organischen Chemie, vol. 4, second work, pages 782, 854, 871 and 906 (1943).
Bunton et al.: Research 4, 383–384 (1951).
McKay et al.: J. Am. Chem. Soc. 79, 4686–4690 (1957).

LEWIS GOTTS, *Primary Examiner.*

MELVIN M. KASSENDOFF, PERRY STITH, *Assistant Examiners.*